United States Patent
Pietraszek et al.

(10) Patent No.: US 8,484,232 B2
(45) Date of Patent: Jul. 9, 2013

(54) METHOD, COMPUTER ARRANGEMENT, COMPUTER PROGRAM AND COMPUTER PROGRAM PRODUCT FOR CHECKING FOR THE PRESENCE OF CONTROL STATEMENTS IN A DATA VALUE

(75) Inventors: Tadeusz J. Pietraszek, Adliswil (CH); Chris P. Vanden Berghe, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1106 days.

(21) Appl. No.: 11/284,837

(22) Filed: Nov. 22, 2005

(65) Prior Publication Data
US 2007/0130620 A1 Jun. 7, 2007

(51) Int. Cl.
*G06F 17/30* (2006.01)
*G06F 7/00* (2006.01)
*H04L 29/06* (2006.01)

(52) U.S. Cl.
USPC .......................................... 707/758; 713/150

(58) Field of Classification Search
USPC ............................ 707/758, 999.006; 713/150
See application file for complete search history.

(56) References Cited

U.S. PATENT DOCUMENTS

| | | | | |
|---|---|---|---|---|
| 6,272,641 | B1* | 8/2001 | Ji | 726/24 |
| 6,275,938 | B1* | 8/2001 | Bond et al. | 726/23 |
| 6,938,164 | B1* | 8/2005 | England et al. | 713/193 |
| 7,010,698 | B2* | 3/2006 | Sheymov | 713/194 |
| 7,234,164 | B2* | 6/2007 | Carmona | 726/22 |
| 2005/0203886 | A1* | 9/2005 | Wong | 707/3 |

* cited by examiner

*Primary Examiner* — Kimberly Wilson
(74) *Attorney, Agent, or Firm* — Scully, Scott, Murphy & Presser, P.C.; Daniel P. Morris, Esq.

(57) ABSTRACT

The invention relates to a method for checking for the presence of control statements in a data value, comprising providing at least one first data value (8) from a trustworthy source (3), receiving at least one second data value (9) from an untrustworthy source (4) and marking the second data value (9) as untrustworthy, performing a computation on the first and second data value (8, 9) resulting in a third data value (10) and marking all parts (11) of the third data value (10), which are derived from the second data value (9), as untrustworthy, and checking the parts (11) of the third data value (10) marked as untrustworthy for the presence of control statements.
The invention further relates to a computer arrangement, a computer program, and a computer program product adapted to perform a method in accordance with the invention.

15 Claims, 3 Drawing Sheets

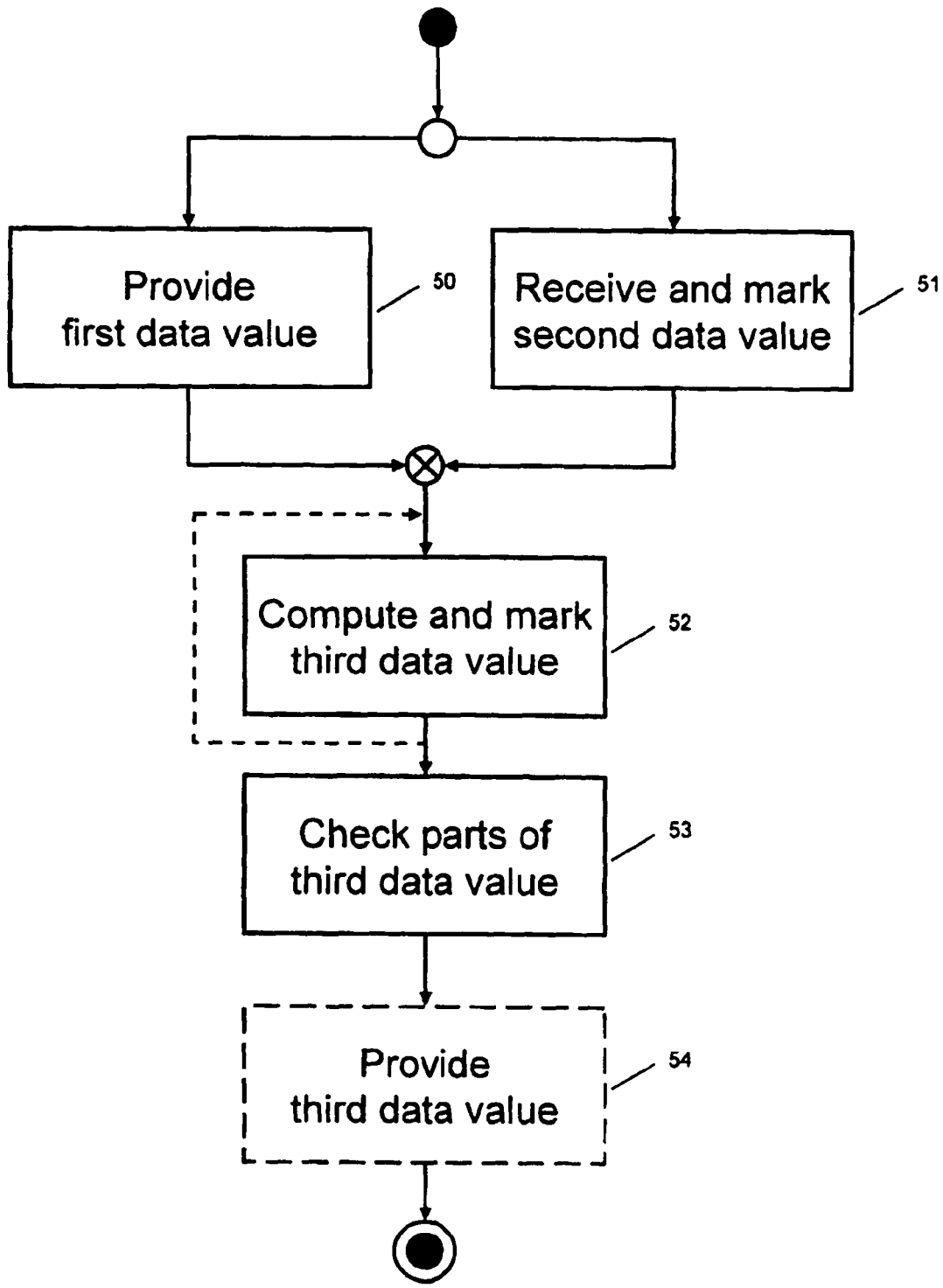

METHOD, COMPUTER ARRANGEMENT, COMPUTER PROGRAM AND COMPUTER PROGRAM PRODUCT FOR CHECKING FOR THE PRESENCE OF CONTROL STATEMENTS IN A DATA VALUE

TECHNICAL FIELD

The present invention relates to a method for checking for the presence of control statements in a data value. The invention relates further to a computer arrangement, a computer program, and a computer program product adapted to perform the inventive method.

BACKGROUND OF THE INVENTION

It is known that distributed applications, particularly applications running in an open network environment like the Internet, are vulnerable to attacks by malicious users or viruses. In particular, web applications such as home banking or online shops accepting data values provided over a data network interface can be manipulated by sending a maliciously crafted data value to the program.

A well-known example of such an attack is the exploitation of buffer overflows. By providing a very large or non-terminated data value to a program, it often fails upon evaluation of the data value, sometimes resulting in a crash of security critical programs or systems. This can be exploited as a means of disabling security measures, among other things.

A second, related attack scenario is to provide a data value that will result in the execution of control statements provided as part of the data value. Such an attack is commonly referred to as an injection attack, where a foreign, typically user-provided control statement is injected in a typically programmer-provided statement.

FIG. 2 shows a schematic data flow diagram for a request to a computer system used for an injection attack. A computer program assembles an SQL query using a template comprised in a first data value 8 and user data provided as a second data value 9. The first data value 8 is provided in the form of a constant of the program by a programmer. The intended meaning of the template provided as first data value 8 is to select the identity "id" of a user from a database table "users", which is identified by a given user name and password.

The second data value 9 received from a user computer comprises a maliciously crafted data value. The second data value 9 provided from a second, untrustworthy data source comprises a control statement in addition to the requested input parameters. By providing the expression "jan' OR '1'='1'" as a first input parameter, a third data value 10, computed based on the first data value 8 and the second data value 9, comprises a query with a different semantics as intended by the programmer of the computer program.

The second data value 9 comprises so-called escape sequences, in this particular case given by the single quote signs, which indicate an end of the data provided as user name and thus would lead to the interpretation of the following OR-expression as part of the control data by a database system. If no further checking is performed and the third data value 10 is passed on unmodified to the database system, a database query processor will evaluate the third data value 10 to a control part 18 and a database 19 as indicated in the lower part of FIG. 2.

Note that parts of the second data value 9 are contained in the control part 18. Due to the order of the execution of the query contained in the control part 18, a valid user id is returned to the computer system 1, even if the password provided as part of the second data value 9 and decoded as data part 19 is incorrect. This is due to the fact that only one part of the OR-expression needs to evaluate to true in order for the database query processor 13 to return a valid result to the computer system 1.

In the given example, the provision of a valid user name suffices to return a valid user id from the database. Because the injected control statement comprises an OR-operator and the AND-operator has precedence over the injected OR-operator, the parts left and right of the OR-operator are evaluated independently. In consequence, the password provided as part of the user data value is irrelevant for the successful completion of the query as the part of the query to the left of the OR-expression alone can produce a result.

A method known as "variable tainting" from the programming language Perl (pages 558-561 of Wall, L., Christiansen, T., and Orwant, J.: Programming Perl, O'Reilly 2000, 3rd edition) is aimed at preventing injection attacks. Data values received from an untrustworthy source, such as an HTTP (hyper text transfer protocol) request, are marked or "tainted" upon reception. The programmer then adds validation code, which checks the received data value for validity and removes the taint. If the program attempts to use a tainted variable without such a previous check, an error message is generated, warning the programmer to include a suitable validation mechanism.

There are problems relating to this approach, however. The code provided for the test has to be written by the application programmer, who may not be aware of all present and future vulnerabilities. If he or she only checks for some common vulnerabilities, for example buffer overflows, while ignoring others, like the injection of an SQL statement, the program may still be successfully attacked without raising an error or warning.

Another problem is the mixing of data values received from different sources, some of which are trustworthy while others are not as was illustrated by the example given in FIG. 2. Because only those parts originating from an untrustworthy source should be checked for the presence of control statements, the check should be performed as early as possible, for example upon first reception of a data value.

The knowledge what to check for, SQL escape characters in an SQL expression in the case of FIG. 2, might not be available upon reception of the second data value 9, however. This knowledge, i.e. the context of it is not fully known until it is output to an external database system 12, for example. Yet, whether or not a data value 9 may be harmful depends on this context, i.e. in the way the data value 9 is used, for example by combining it with the first data value 8. Consequently the check should be performed after this context is known, i.e. as late as possible.

Obviously these two requirements are conflicting, resulting in checks that will be either too restrictive, severely limiting the functionality of developed applications, or too lax to guarantee stringent security requirements.

Consequently, it is a challenge to provide improved methods and systems for checking a data value.

SUMMARY OF THE INVENTION

According to a first aspect of the invention, a method for checking for the presence of control statements in a data value is provided. According to the method, at least one first data value is provided from a trustworthy source. At least one second data value is received from an untrustworthy source and marked as being untrustworthy. In a further step, a computation on the first and second data value is performed resulting in a third data value whereby all parts of the third data value which are derived from the second data value are marked as untrustworthy. The parts of the third data value marked as untrustworthy are checked for the presence of control statements.

By marking only those parts of the third data value that are derived from an untrustworthy source as untrustworthy, attacks based on the injection of control statements using second data values provided from an untrustworthy source can still be detected in the third data value.

According to an advantageous embodiment of the first aspect, the checking of the untrustworthy parts of the third data value depends on the usage of the data value.

It is advantageous to make the check dependent on the particular usage of the third data value. For example, a third data value that is sent to a command shell interpreter must be checked in different way than a data value sent to a database system.

According to a further embodiment of the first aspect, the checking of the parts of the third data value depends on its context.

Depending on the context of the untrustworthy parts of the third data value, given by the first data value, for example, certain assumptions about the received second data value and the parts of the third data value derived therefrom can be made. For example, an application expecting a numerical parameter should verify that the corresponding part of the third data value checked constitutes a number.

According to a further advantageous embodiment of the first aspect, the first, second and third data value are character strings, the performed computation is a character string operation, and characters copied from the second data value to the third data value are marked as untrustworthy.

As data exchanged in open network architectures is often serialized into a textual representation, it is particularly important to check character strings for the presence of control statements. Character string operations often generate a new third data value based on a combination of characters taken from a first and second data value. By marking those characters taken from the second data value as untrustworthy, their origin can be traced in the generated third data value.

According to a further advantageous embodiment of the first aspect, the method further comprises the step of generating and providing a warning message, if a control statement is identified in the third data value.

By providing a warning message, injection attacks can be readily identified by a responsible person or system, for example, a network administrator.

According to a further advantageous embodiment of the first aspect, the method further comprises the step of providing the third data value for further processing, if no control statement is identified in the third data value.

By providing the third data value for further processing only after it has been checked for the presence of control statements, further processing can take place without the risk of injection attacks.

According to a further advantageous embodiment of the first aspect, the third data value is provided for further processing, after removing any control statements identified in the third data value.

Removing any identified control statements and providing the remaining third data value for further processing has the advantage that further processing can be attempted safely, even if potentially dangerous data value is provided as second data value.

According to a further advantageous embodiment of the first aspect, the third data value comprises a database query and the third data value is provided to a database system for further processing.

By assembling and checking a database query according to the first aspect of the invention, a database system can be integrated safely into an application processing data values provided from an untrustworthy source.

According to another advantageous embodiment of the first aspect, the third data value comprises a processing instruction and is provided to an instruction processor for further processing.

By assembling and checking a processing instruction, for example a shell command for performing some operation on a file or directory, a program receiving a second data value from an untrustworthy source can safely use an instruction processor for further processing, for example for executing the shell command.

According to another advantageous embodiment of the present invention, the third data value comprises a locating expression and is provided to a locator for further processing.

By assembling and checking a locating expression, for example an XPath expression, a program receiving a second data value from an untrustworthy source can make use of a locator, for example an XPath processor for locating or selecting elements of an XML document, without the risk of injection attacks.

According to a further advantageous embodiment of the first aspect, the third data value comprises an output instruction and is provided to an output processor for further processing.

By assembling and checking an output instruction, for example a html document for a web page, a program receiving a second data value from an untrustworthy source can make safe use of an output processor, for example a rendering engine for the display of web pages.

According to a further advantageous embodiment of the first aspect, the data values can be stored and retrieved and, on storing, all parts of a data value marked as untrustworthy are stored in such a way that, on retrieving, these parts of the data value are marked as untrustworthy.

Not all maliciously crafted data values are intended to manipulate the receiving program directly. Instead, higher order injection attacks are based on the principle that in a first phase a malicious data value is injected into a first system and stored somewhere, for example a database or file system, without causing any harm. However, upon retrieving this value for further processing, this time from a local and thus supposedly trustworthy source, a second, potentially different system can be affected by the crafted data value.

By allowing the storage and later retrieval of data received from an untrustworthy source and maintaining the information about the trustworthiness of such data, higher order injection attacks are prevented. This is particularly important for applications where data provided from an untrustworthy source is stored and later retrieved, such that it appears that it originates from a trustworthy source whereas in fact it does not.

According to a second aspect of the invention, a computer arrangement is provided that comprises a trustworthy first data source adapted to provide a first data value, an untrustworthy second data source adapted to provide a second data value, a data marker adapted to mark the second data value as untrustworthy, a processor adapted to perform a computation on the first and second data value resulting in a third data value and to mark all parts of the third data value, which are derived from the second data value, as untrustworthy, a data tester adapted to check the parts of the third data value marked as untrustworthy for the presence of control statements and a data provider adapted to provide the third data value for further processing.

Such a computer arrangement has the advantage that it can check third data values that are based on a computation on the first and second data values for the presence of control statements and consequently can detect injection attacks before the third data value is provided for further processing.

According to an advantageous embodiment of the second aspect, the first data source is a computer program and the first data value is a constant provided by the program.

According to this embodiment, a constant provided by a programmer of a computer program is considered to originate from a trustworthy source. This is advantageous as it allows the programmer to provide parts of the third data value comprising control statements based on the first data value to an external system for further processing.

According to a further advantageous embodiment of the second aspect, the second data source is a data network interface and the second data value is a value provided over the data network.

According to this embodiment, the computer arrangement can provide a service over an open network, such as the Internet, while preventing injection attacks commonly received over such networks.

According to a further advantageous embodiment of the second aspect, the computer arrangement further comprises a data processing system adapted to process the third data value based on control statements contained therein.

By providing a data processing system, complicated tasks such as database queries or output processing can be outsourced to a dedicated data processing system, making it easier to develop modular programs.

According to a third aspect of the present invention, a computer program comprising program instructions adapted to perform all of the steps of any one method according to the first aspect of the invention is provided.

By providing a computer program providing program instructions, a method according to an embodiment of the present invention can be executed by a computer.

According to a fourth aspect of the present invention, a computer program product comprising a computer-readable medium embodying program instructions executable by a processor is provided. The program instructions provide a first data value from a trustworthy source, receive a second data value from an untrustworthy source and mark the second data value as untrustworthy, perform a computation on the first and second data value resulting in a third data value and mark all parts of the third data value, which are derived from the second data value, as untrustworthy. The program instructions further perform a check on the parts of the third data value marked as untrustworthy for the presence of control statements and provide the third data value for further processing.

By providing a computer program product with a computer-readable medium, a program performing a method in accordance with an embodiment of the present invention can be provided to a computer system.

According to a fifth aspect of the present invention, a method for deploying computing infrastructure, comprising integrating computer readable code into a computing system is provided. The code in combination with the computing system is capable of performing the following:

checking for the presence of control statements in a data value, comprising providing at least one first data value from a trustworthy source, receiving at least one second data value from an untrustworthy source and marking the second data value as untrustworthy, performing a computation on the first data value and second data value resulting in a third data value and marking all parts of the third data value which are derived from the second data value as untrustworthy, and checking the parts of the third data value marked as untrustworthy for the presence of control statements.

This method can be advantageously performed by computer service providers.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating:

FIG. 4, a flow chart for checking for the presence of control statements in a data value.

DETAILED DESCRIPTION OF THE DRAWINGS

Figure 1:
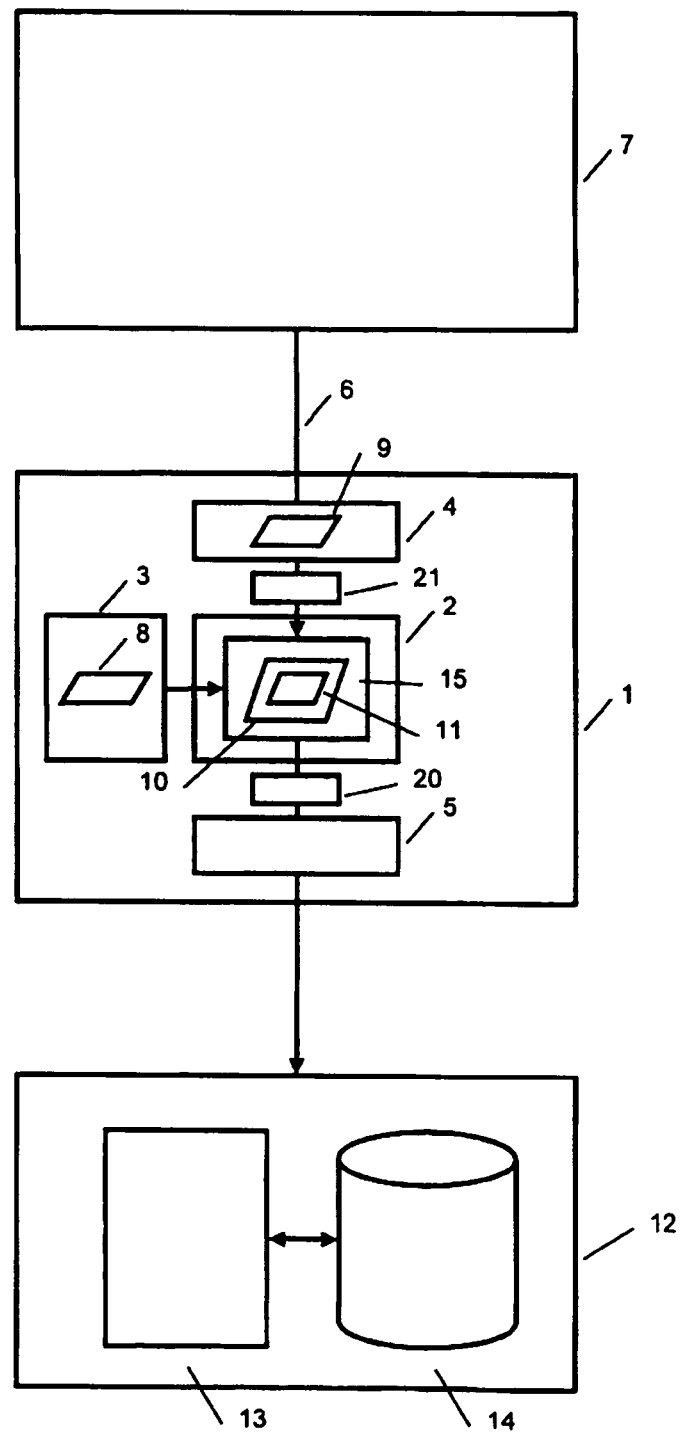
FIG. 1, a computer arrangement.

FIG. 1 shows a computer arrangement. The computer arrangement comprises a computer system 1 having a processor 2, a first, trustworthy data source 3 and a second, untrustworthy data source 4. In addition, the computer system 1 comprises an interface 5, adapted to provide data for further processing.

In the presented example, the second, untrustworthy data source 4 is connected by means of a data network 6 to a user computer 7, which can be used to provide data values to the computer system 1. A data marker 21 is adapted to mark all data values received from the second, untrustworthy data source 4 as untrustworthy.

The data marker 21 can be implemented as part of the data source 4, which might be, for example, a programming library providing access to network sockets. In a similar way, data values read from other data sources, such as a keyboard or a local or remote file system can be marked. Alternatively the data marker 21 might be implemented as a separate functional unit in hard- or software, for example as part of the program 15 or a programming platform used to execute it.

A computer program 15 running on the processor 2 combines a first data value 8 provided by the first, trustworthy data source 3 with a second data value 9, provided by the user computer 7 via the second, untrustworthy data source 4. As a result, the program 15 computes a third data value 10 for further processing.

The program 15 might be a PHP program or a computer program written in any other programming language, especially a scripting language used to build a complex system from multiple subsystems. A computer-readable medium may be provided embodying program instructions of the program 15 executable by the processor 2 of the computer system 1, for example. The computer-readable medium may, for example, be a CDROM, a flash memory card, a hard disk, or any other suitable computer-readable medium.

Before the third data value 10 is made available through the interface 5 to an external system 12 for further processing, all parts 11 of the third data value 10 that are derived from the second data value 9 are checked for the presence of control statements using a data tester 20. If no control statement is detected in any part 11 of the third data value 10, the third data value 10 is provided to the external system 12.

The data tester 20 can be, for example, part of the program 15, the interface 5 or a separate functional unit. The external system 12 is only external in the sense that it is not an integral part of the computer program 15. It may, however, run on the same processor 2, be part of the same computer system 1 or both.

In the given example, the external system 12 is a database system comprising a database query processor 13 and a database 14. The database query processor 13 receives the third data value 10 and analyses a query expression comprised therein. According to control statements and data content of the query, a query plan is generated and executed over the database 14. Typically the query processor will return a result to the computer system 1 for further processing received from the database 14 in response to the query. Alternatively or in addition, the internal state of the external system 12 may change, for example through the insertion or modification of records of the database 14.

Figure 2:
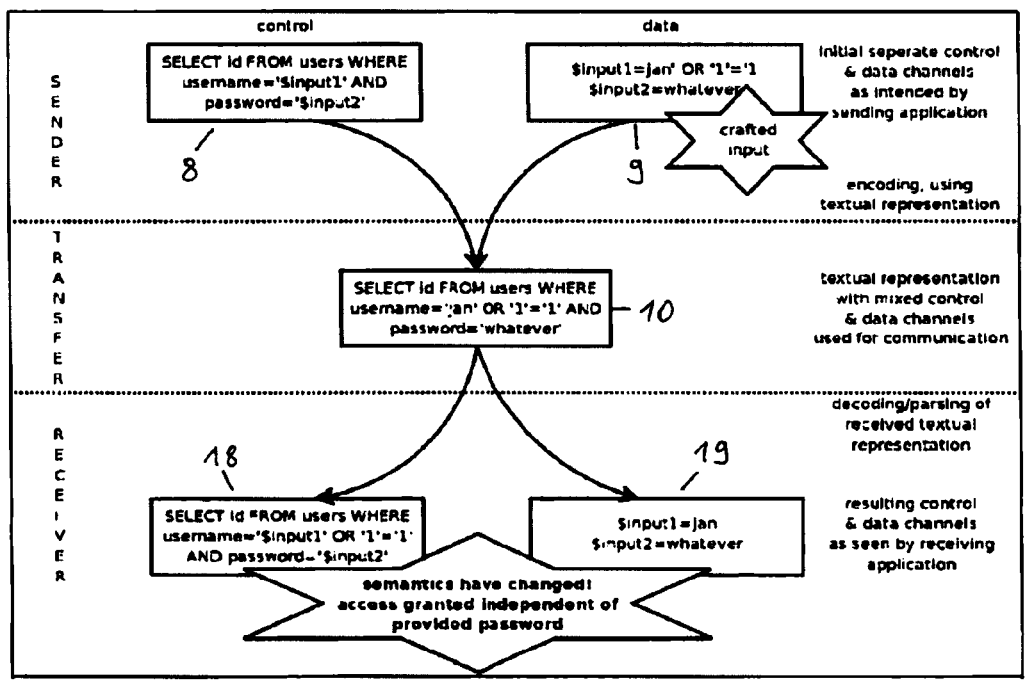
FIG. 2, a schematic data flow diagram for a system vulnerable to an injection attack.
Figure 3:
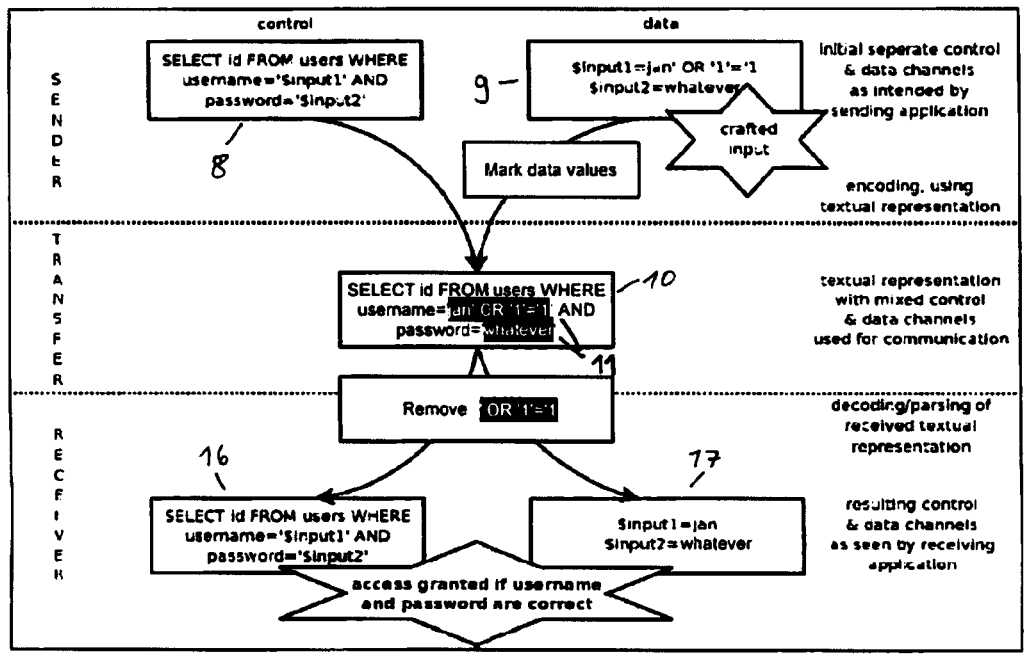
FIG. 3, a schematic data flow diagram, in which the mixing of control and user data in a program is prevented.

FIG. 3 shows a schematic data flow diagram for a request to the computer system 1. The computer program 15 assembles a query using a template comprised in a first data value 8 and user data provided as a second data value 9 as described in accordance with FIG. 2 in the outset. This time, however, the second data value 9 is marked upon reception from the untrustworthy source 4 by the data marker 21. In addition, parts 11 of the third data value 10 derived from the second data value 9 are also marked as untrustworthy. The parts 11 are shown in inverse in FIG. 3 for easy of identification.

Consequently, the data tester 20 can identify the potentially harmful content comprised in the third data value 10, before it is passed on to the database system 12. In the given example, the data tester removes all parts of the parts 11 of the third data value that correspond to database control statements, i.e. the escape sequence followed by the OR-expression. Thus, upon receiving, the database query processor 13 decodes a control part 16 and data part 17 as intended by the programmer of the program 15.

Only if the combination of the user name "jan" and password "whatever" provided to the database system 12 is valid, a valid user id is returned from the database system 12 to the computer system 1 and the program 15 can proceed as intended, for example by granting access to restricted resources of the computer system 1. Otherwise, as will probably be the case for the maliciously crafted data value 9, an empty query result will be returned by the database query processor 13 to the program 15, such that the program 15 recognizes that the access data provided from the user computer 7 was invalid and can, for example, refuse access to resources of the computer system 1 or the external system 12 for the user computer 7.

In an advantageous embodiment of the present invention, the data marker 21, marking the second data value 9 as untrustworthy, and the data tester 20, adapted to check the parts 11 of the third data value 10 marked as untrustworthy for the presence of control statements, are integrated into a program execution platform, on which the program 15 is executed. By modifying the program execution platform instead of a program 15, existing programs 15 can be used without changing the code of the computer program 15 itself.

In addition, the program execution platform may provide a library of computer functions used for performing computations based on the first and second data value 8 and 9, respectively, e.g. a library comprising string functions such as concatenation, substring selection, deletion or insertion and the like. By modifying the library accordingly, parts 11 of third data values 10 derived from a second data value 9 using a function of the library can be marked as untrustworthy without modifying the program 15.

FIG. 4 shows a flow chart for checking for the presence of control statements in a data value.

In a first step 50, a first data value 8 is provided by a trustworthy source 3. This may be, among others, a constant provided by a computer program 15. Other forms of trustworthy data sources 3 may comprise local storage facilities, users input authorized by means of secure authentication, e.g. using an electronic signature or the like.

In a step 51, a second data value 9 is received from an untrustworthy source 8 and marked as untrustworthy. Untrustworthy data values 9 can originate, among others, from anonymous network sources, remote storage facilities, keyboard input or untrustworthy computer programs or modules. Depending on the implementation and specific security needs and policies, the marking can be implemented in different ways. For example, a relatively simple bitmap could be provided, wherein a bit indicates for every atomic part of a provided data value, for example for every character of a string, whether it trustworthy or not. More complicated marking schemes could record additional metadata, such as the data source from which the data value originated or modifications applied to the data value since its reception from the untrustworthy data source 4. Alternatively to storing metadata for all data values, such metadata could be restricted to trustworthy or untrustworthy data, respectively.

In a step 52, a computation based on the first and second data value 8 and 9 is performed whereby one or several parts 11 of the third data value 10, which are derived from the second data value 9, are marked as untrustworthy. The computation can be, for example, the replacing of a placeholder in a template string contained in the first data value 8 with the second data value 9 or the concatenation of the first and second data values 8 and 9. In this case, characters taken from the second data value 9 or marked as untrustworthy in the third data value 10. The computation can, of course, also comprise other operations or data types and more than one trustworthy data value 8 or untrustworthy data value 9, respectively. Equally data values 8 and 9 might originate from a multiplicity of trustworthy and untrustworthy sources 3 and 4.

As indicated by the dashed arrow in FIG. 4, the step of computing 52 can be repeated to allow further computations to be performed upon trustworthy, untrustworthy or partly trustworthy data values 8, 9 or 10 respectively as long as all parts 11 ultimately derived from an untrustworthy source 4 are marked as untrustworthy in the resulting third data value 10.

In a further step 53, the parts 11 of the third data value 10 marked as untrustworthy are checked for the presence of control statements. For example, all escape characters or sequences present in a data value 10 can be identified. In addition, reserved words or control characters such as shell command, SQL statements, XPath expressions, path names, XSLT transformations, rendering statements, HTML or XML elements or all other potentially maliciously crafted data value can be identified in the third data value 10.

In an advantageous embodiment, the data tester 20 makes use of contextual knowledge such as the context given by the third data value 10 itself, its type or the type and kind of the external system 12 the third data value 10 is provided to. For example, an SQL statement provided to a rendering engine for outputting does not imply any security risk and can be allowed whereas the same content is not allowable for an external database system. Another example of contextual knowledge is the syntactical function of the data value within the statement, for example as string or numerical value in the case of an SQL statement, which impacts the relevant escape characters to check for.

According to some embodiments of the first aspect, in a step 54, the checked third data value 10 is provided to an external system 12 for further processing. This step is optional, however, as, depending on the security settings of the computer system 1, the provision of the third data value 10 might be prevented, modified or redirected. For example, if the escape characters present in the third data value 10 shown in FIG. 3 would have been removed from the parts 11 derived from the second data value 2, the resulting query would have had the semantics intended by the programmer of the program 15 and would have probably resulted in a denial of access as desired.

Other modifications of the steps presented in FIG. 4, their ordering and scope may be performed by a person skilled in the art without departing from the spirit of the invention.

The scientific background of injection attacks, their exploitation using channel mixing and their prevention using context sensitive checks on data values is described in more detail in a paper titled "Defending against Injection Attacks through Context-Sensitive String Evaluation" by T. Pietraszek and C. Vanden Berghe, presented during the 8th International Symposium on Recent Advances in Intrusion Detection 2005. This paper is incorporated in its entirety by reference.

The invention claimed is:

1. A method for checking for the presence of control statements in a data value, comprising:
   providing at least one first data value (8) from a trustworthy source (3);
   receiving at least one second data value (9) from an untrustworthy source (4) and marking the second data value (9) as untrustworthy;
   performing a computation on the first data value (8) and second data value (9) resulting in a third data value (10) and marking parts (11) of the third data value (10) which are derived from the second data value (9) as untrustworthy, said computation including replacing a portion of the first data value (8) with the second data value (9); and
   checking the parts (11) of the third data value (10) marked as untrustworthy for a presence of control statements,
   wherein if no control statement is detected, then providing said third data value for further processing, and
   wherein if a control statement is identified, then providing said third data for further processing only after removing said control statement from said third data value.

2. The method according to claim 1, wherein the checking of the parts (11) of the third data value (10) depends on the usage of the third data value (10).

3. The method according to claim 1, wherein
   the checking of the parts (11) of the third data value (10) depends on the contexts of the parts (11) of the third data value (10).

4. The method according to claim 1, wherein
   the first, second, and third data values (8, 9, 10) are character strings,
   the performed computation is a character string operation, and
   characters derived from the second data value (9) in the third data value (10) are marked as untrustworthy.

5. The method according to claim 1, further comprising generating and providing a warning message if a control statement is identified in at least one part (11) of the third data value (10).

6. The method according to claim 1, wherein
   the third data value (10) comprises a processing instruction, and
   the third data value (10) is provided to an instruction processor for further processing.

7. The method according to claim 1, wherein
   the third data value (10) comprises a locating expression, and
   the third data value (10) is provided to a locator for further processing.

8. The method according to claim 1, wherein
   the third data value (10) comprises an output instruction, and
   the third data value (10) is provided to an output processor for further processing.

9. The method according to claim 1, wherein
   data values (8, 9, 10) can be stored and retrieved, and
   on storing, the parts (11) of a data value (8,9, 10) marked as untrustworthy are stored in such a way that, on retrieving, the parts (11) of the data value (8, 9, 10) are marked as untrustworthy.

10. The method according to claim 1, wherein said further processing comprises one or more of: modifying or redirecting said third data value based on a security setting of a computer system.

11. A system for checking for the presence of control statements in a data value, comprising:
    a trustworthy first data source (3) configured to provide a first data value (8);
    an untrustworthy second data source (4) configured to provide a second data value (9);
    a data marker (21) configured to mark the second data value (9) as untrustworthy;
    a processor (2) configured to perform a computation on the first and second data values (8, 9) resulting in a third data value (10) and to mark parts (11) of the third data value (10), which are derived from the second data value (9) as untrustworthy, said computation including replacing a portion of the first data value (8) with the second data value (9); and
    a data tester (20) configured to check the parts (11) of the third data value (10) marked as untrustworthy for a presence of control statements,
    wherein if no control statement is detected, then said third data value is provided via an interface (5) for further processing, and
    wherein if a control statement is identified, then said third data is provided via said interface (5) for further processing only after removing said control statement from said third data value.

12. The system according to claim 11, wherein the first data source (3) is a computer program (15) and the first data value (8) is a constant provided by the program (15).

13. The system according to claim 11, wherein the second data source (4) is a data network interface and the second data value (9) is a value provided over a data network (6).

14. The system according to claim 11, further comprising:
    a data processing system (12) configured to process the third data value (10) based on control statements (16, 18) contained therein.

15. A computer program product comprising a tangible computer-readable device embodying program instructions executable by a processor to perform a method for checking for the presence of control statements in a data value, said method comprising:
- providing at least one first data value (8) from a trustworthy source (3);
- receiving at least one second data value (9) from an untrustworthy source (4) and marking the second data value (9) as untrustworthy;
- performing a computation on the first data value (8) and second data value (9) resulting in a third data value (10) and marking parts (11) of the third data value (10) which are derived from the second data value (9) as untrustworthy, said computation including replacing a portion of the first data value (8) with the second data value (9); and
- checking the parts (11) of the third data value (10) marked as untrustworthy for a presence of control statements,
- wherein if no control statement is detected, then providing said third data value for further processing, and
- wherein if a control statement is identified, then providing said third data for further processing only after removing said control statement from said third data value.

* * * * *